H. M. HILL.
LAMP FOR STEREOPTICONS.
APPLICATION FILED AUG. 23, 1913.
1,153,161.
Patented Sept. 7, 1915.
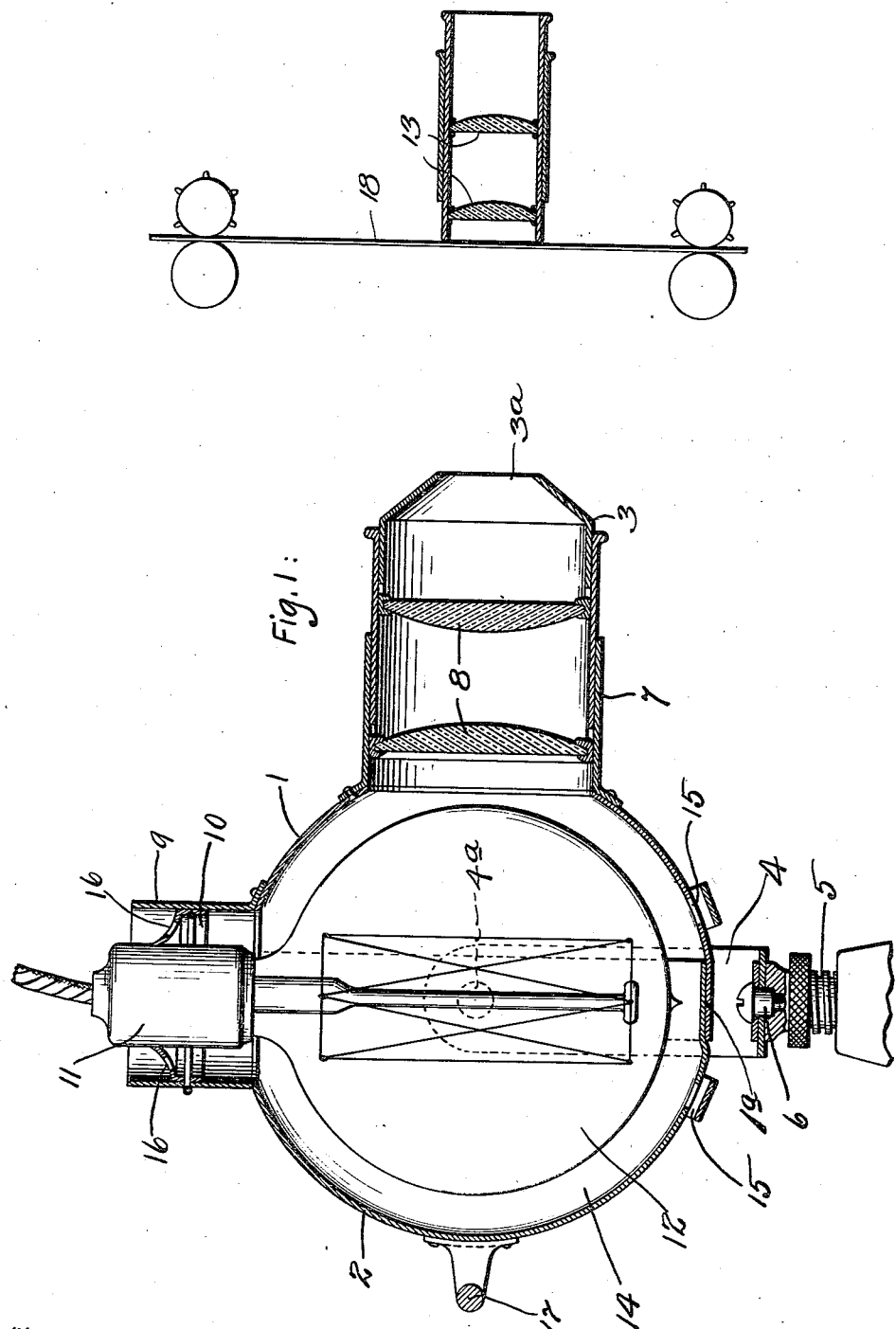
Witnesses
Wm. James.
A. S. Butler.
Inventor.
Harry M. Hill
By A. C. Cornwall Att'y.

UNITED STATES PATENT OFFICE.

HARRY M. HILL, OF KIRKWOOD, MISSOURI.

LAMP FOR STEREOPTICONS.

1,153,161. Specification of Letters Patent. Patented Sept. 7, 1915.

Application filed August 23, 1913. Serial No. 786,324.

*To all whom it may concern:*

Be it known that I, HARRY M. HILL, a citizen of the United States, residing at Kirkwood, St. Louis county, Missouri, have invented a certain new and useful Improvement in Lamps for Stereopticons, of which the following is a full, clear, and exact description, such as will enable others skilled in the art to which it appertains to make and use the same, reference being had to the accompanying drawings, forming part of this specification, in which—

My invention relates broadly to projecting apparatus and specifically to an improved form of stereopticon lamp adapted for the projection of views from slides or from moving picture films.

The principal object of my invention is to produce such a device which furnishes a brilliant light suitable for the projection of moving pictures but which does not subject the film to heat of a degree sufficient to injure it.

A further object of my invention is to provide a stereopticon lamp which is adapted to provide a suitable illumination for the projection of moving pictures by the use of a filament lamp.

A further object of my invention is to provide a stereopticon lamp suitable for the projection of moving pictures which is economical to manufacture and easy and safe to operate.

Other and further objects of my invention will be obvious from the construction of the device.

It is a well recognized fact that the stereopticon lamp at present most successful and most universally employed for the projection of moving pictures generates heat to a degree which is dangerous to the film if an area of the film is exposed to it for any appreciable time. Numerous expedients for safe-guarding the film from ignition or injury from the heat projected upon it with the light have been employed, such as the ejection of a current of air upon the film, and the employment of a safety shutter which is interposed between the lamp and the film whenever the movement of the film ceases for a period in excess of the time requisite for the projection of the view. The heat to which the film is subjected is primarily due to the employment of the electric arc as a source of light, which itself generates a high degree of heat, and the concentration of the actinic rays of the arc upon the film by the condensing lenses.

By the use of my invention I am enabled to provide an illumination which fills all the requirements for the projection of moving pictures, and which at the same time obviates many of the objectionable features of the device now commonly in use. In addition, my invention affords a device which is easily operated and which requires no attention as to the regulation of the light. Furthermore, not only does the device which I have produced obviate the film's being subjected to dangerous heat, but it also does not subject the operator to the danger and discomfort occasioned by an excessively heated lamp housing.

By virtue of these features it is not necessary to mount the projecting apparatus in a projecting house, and by virtue of the fact that the low voltage current is employed, the device may be used with safety on the stage behind the screen or in the orchestra pit, and is particularly adapted for easy transportation.

The figure shows my improved stereopticon lamp in vertical section on its longitudinal axis.

My device preferably is constructed in the form of a substantially spherical lamp house made of any suitable material and formed with two substantially hemispherical sections, the anterior or stationary section 1 and the posterior or removable section 2. The stationary section 1 is supported on any suitable support 4 which permits of vertical adjustment as by the screw 5, horizontal adjustment as by the pivot 6, and a rocking adjustment on the pivots 4ª. The posterior or removable section 2 is adapted to be supported on the stationary section by frictional engagement when the parts are fitted together as shown at 1ª or by any other suitable means. An aperture is provided through the anterior section about which is disposed the barrel 7 for supporting the large condensing lenses 8 which are adjustable within the barrel 7 and also relative to each other. Suitably supported on the lamp house is the lamp barrel 9 in which is carried the removable lamp support 10 which carries the lamp socket 11. The lamp socket is adapted to receive the lamp 12 and support it in proper position within the lamp house. The inner surface of the lamp house is made highly reflective, as by plating with silver or in any other suitable fashion. Adjustably mounted on the barrel 7 in front of the lenses 8 is an annular diaphragm member 3 which partially closes the front of the barrel 7, and having an axial aperture $3^a$ for the passage of the beam of light to the projecting lenses 13. The effect of this diaphragm is to cut down the volume or the size of the beam of light which is projected against the film without reducing its brilliancy or intensity. There is an air space between the front of the diaphragm 3 and the film, and the beam of light is cooled to a great extent while passing through this air space. If the entire beam from the condensing lenses 8 were projected against the film across this space, it would not be cooled to the temperature to which the smaller beam projected from the diaphragm is cooled, due to the fact, of course, that while the volume of the beam would be greater, the amount of air which is effective to cool it would not be greater, and hence the opportunity for convection of the heat would be no greater. This diaphragm member, therefore, forms an effective means for controlling the temperature of the beam projected upon the film.

In the device as illustrated, I employ a standard 500-watt tungsten lamp. The size of the lamp house is such as to provide an air space 14 between the lamp and the housing which permits of the proper circulation of air to carry off the heat from the lamp. The circulation of air is facilitated by the provision of suitable ventilators 15 in the lower part of the housing and ventilators 16 in the upper part thereof. A suitable handle 17 is provided on the posterior portion whereby it may be removed and replaced, and the lamp housing and condenser moved for adjustment. The large extent of filament and the highly reflective surface surrounding the lamp provide an illumination of uniform brilliancy at all points in the area of the condensing lenses, and the filament lamp provides a constant and steady light without any considerable amount of heat. Consequently, the illumination of the film 18 is uniform, steady and brilliant, but the film is not subjected to an amount of heat sufficient to blister or ignite it, no matter how long the same area may be exposed to the light.

The circulation of the air within the housing and around the lamp keeps the housing exceedingly cool and prevents injury to the lamp. Thereby danger of fire from the stereopticon is prevented and the operation of the device is greatly facilitated.

From the foregoing, it is obvious that my device comprises a complete and efficient projecting stereopticon lamp occupying a minimum amount of space, of great efficiency for its size and safe and easy to operate.

I am aware that modifications may be made in the structure illustrated without departing from the scope of my invention, and I, therefore, do not intend that my invention be construed as limited to the particular form illustrated.

What I claim is:

1. A lamp of the class described comprising a pair of substantially hemispherical housing portions one supported upon the other and adapted to inclose a luminant, means on one of said portions for supporting the luminant, a barrel mounted on one of said housing portions, and condensing lenses mounted in said barrel.

2. A lamp of the class described comprising removable housing portions adapted to inclose a luminant, a support for a luminant provided on one of said housing portions, a barrel supported on one of said housing portions, condensing lenses supported thereby, and a diaphragm member having an axial aperture of less diameter than the barrel supported thereon in front of the condensing lenses.

In testimony whereof I hereunto affix my signature in the presence of two witnesses, this 24th day of April, 1913.

HARRY M. HILL.

Witnesses:
M. P. SMITH,
M. A. HANDEL.